US006820082B1

(12) United States Patent
Cook et al.

(10) Patent No.: US 6,820,082 B1
(45) Date of Patent: Nov. 16, 2004

(54) RULE BASED DATABASE SECURITY SYSTEM AND METHOD

(75) Inventors: William R. Cook, Redwood City, CA (US); Martin R. Gannholm, San Francisco, CA (US)

(73) Assignee: Allegis Corporation, San Francisco, CA (US)

( * ) Notice: Subject to any disclaimer, the term of this patent is extended or adjusted under 35 U.S.C. 154(b) by 0 days.

(21) Appl. No.: 09/541,227

(22) Filed: Apr. 3, 2000

(51) Int. Cl.[7] .................................................. G06F 17/30
(52) U.S. Cl. ................................................. 707/9; 707/3
(58) Field of Search .............................. 707/9, 4, 101, 707/103 Z, 513; 713/201, 200

(56) References Cited

U.S. PATENT DOCUMENTS

| | | | | |
|---|---|---|---|---|
| 5,265,221 A | * | 11/1993 | Miller ......................... 711/163 |
| 5,355,474 A | * | 10/1994 | Thuraisngham et al. ........ 707/9 |
| 5,408,657 A | | 4/1995 | Bigelow et al. ............. 395/600 |
| 5,630,127 A | * | 5/1997 | Moore et al. ........... 707/103 R |
| 5,680,614 A | | 10/1997 | Bakuya et al. .............. 395/614 |
| 5,696,898 A | * | 12/1997 | Baker et al. ................ 713/201 |
| 5,720,033 A | * | 2/1998 | Deo ........................... 713/200 |
| 5,751,949 A | * | 5/1998 | Thomson et al. ........... 713/201 |
| 5,765,160 A | | 6/1998 | Yamaguchi ................ 707/103 |
| 5,826,268 A | | 10/1998 | Schaefer et al. ................ 707/9 |
| 5,905,984 A | * | 5/1999 | Thorsen ......................... 707/9 |
| 5,999,978 A | * | 12/1999 | Angal et al. ................. 709/229 |
| 6,006,224 A | * | 12/1999 | McComb et al. .............. 707/5 |
| 6,038,563 A | * | 3/2000 | Bapat et al. ................... 707/10 |
| 6,161,110 A | * | 12/2000 | Curtis et al. ................ 707/204 |
| 6,226,745 B1 | * | 5/2001 | Wiederhold .................... 707/9 |
| 6,253,203 B1 | * | 6/2001 | O'Flaherty et al. ............ 707/9 |
| 6,275,824 B1 | * | 8/2001 | O'Flaherty et al. ............ 707/9 |
| 6,336,117 B1 | * | 1/2002 | Massarani .................... 707/100 |
| 6,470,332 B1 | * | 10/2002 | Weschler ....................... 707/3 |
| 6,526,403 B1 | * | 2/2003 | Lin et al. ....................... 707/4 |
| 6,560,592 B1 | * | 5/2003 | Reid et al. ..................... 707/2 |

* cited by examiner

Primary Examiner—Kim Vu
Assistant Examiner—Monplaisir Hamilton
(74) Attorney, Agent, or Firm—Van Pelt & Yi LLP (57) ABSTRACT

A rule-based database security system and method are disclosed. A method for processing requests from a user to perform an action with respect to data stored in an electronic database includes defining a plurality of user defined rules containing security constraints for accessing the data and receiving a request at a user interface. The request is transferred from the user interface to a rule engine and the plurality of rules are applied to the request to determine if the request passes the security constraints. The method further includes modifying the request if required to meet the security constraints. The data is accessed to perform the request if the request meets the security constraints.

22 Claims, 6 Drawing Sheets

ORGANIZATION TABLE

| ORGANIZATION ID | TYPE | ORGANIZATION NAME |
|---|---|---|
| A | PARTNER | |
| B | PARTNER | |
| C | VENDOR | |

PRIOR ART
FIG. 4A

PERSON TABLE

| PERSON ID | EMPLOYER | NAME OF PERSON |
|---|---|---|
| V | A | |
| W | B | |
| X | C | |
| Y | C | |
| Z | C | |

PRIOR ART
FIG. 4B

| TEAM | PERSON |
|---|---|
| A | X |
| A | Y |
| B | Y |
| B | Z |

RULE BASED DATABASE SECURITY SYSTEM AND METHOD

BACKGROUND OF THE INVENTION

The present invention relates generally to database management systems, and more particularly to database security for controlling database access and updates.

Conventional database systems utilize a plurality of tables to store information such as users, relationship of users, and access privileges of users. Database systems often utilize three tier software architecture which includes a user interface, database, and an application server located between the user interface and database. In a network environment the application server provides resources to multiple clients. For example, a user retrieves information from tables by entering input that is converted to queries by an application server. The application server submits the queries to a database server. In response to the query, the database server accesses the tables specified in the query to determine which information within the tables satisfies the queries. The information that satisfies the queries is then retrieved by the database server and transmitted to the application server, and ultimately to the user.

The application server may provide process management where business logic is executed and provides functions such as queuing, application execution, and database access, for example. Business logic may include programs that perform functions such as retrieving data from files, ensuring security and integrity, and undertaking table manipulations (e.g., updates, deletions, calculations, and the like). The business logic and management of these systems is typically implemented using compiled code. Since the business logic and database management cannot be reconfigured without revising the code and recompiling the program, making changes to the application server is often time consuming and can only be performed by someone with in depth knowledge of the system.

Furthermore, changes to database security may also be difficult for users of the system to implement. Security is typically provided through access control lists which specify the privileges of particular users with respect to data to identify which users are allowed access to data or are permitted to edit the data. The users may be grouped together by system administrators so that security is defined for certain groups. If changes to the security system are required, to allow additional people or groups access to specific data, for example, the access control lists need to be redefined. Access control lists may either be associated with tables or with rows within a table. Another common technique is to define security based on views, which are predefined subsets of a table. To provide true row-level security control for individual users, every user would have to have their own view. Since views are part of the low-level code of an application, adding a new user would require updating the application. In the first case, it is difficult to control access or updates to specific rows within the table since a user typically has access to all of a table or none of a table. This makes it difficult to handle common situations, such as when a user wants to access or update rows that the user has created. In the second case, where access control lists are defined for each row, the number of access control lists can be very large. It is not uncommon to have tables that contain from ten thousand to over one million rows. While individual access control lists provide very fine control, the control lists quickly become unmanageable and updating thousands of control lists is not practical. As a result, security is compromised or does not properly reflect the desired controls.

Another drawback with access control lists is that they do not depend upon the state of the data in a row. For example, access control lists do not allow a user to update a row that he created as long its status is "draft," and prevent the user from updating the row once its status changes to "submitted."

There is, therefore, a need for a database management system that provides an easily configurable business logic that allows for security policies that can be created to apply to different situations and applied automatically.

SUMMARY OF THE INVENTION

A rule-based database security system and method are disclosed. In one aspect of the invention a method is for processing requests from a user to perform an action with respect to data stored in an electronic database. The method includes defining a plurality of user defined rules containing security constraints for accessing the data and receiving a request at a user interface. The request is transferred from the user interface to a rule engine. The plurality of rules are applied to the request to determine if the request passes the security constraints and the request is modified if required to meet the security constraints. The method further includes accessing the data to perform the request if the request meets the security constraints.

In another aspect of the present invention a method for processing requests for accessing a database includes receiving a query for data from the database at a user interface and transferring the query to a rule engine. The rule engine has a plurality of user defined rules containing security constraints for accessing the data. The method further includes modifying the query by applying the plurality of rules to the query to limit the amount of data requested from the database based on the security constraints. The modified query is issued to the database and data obtained from the databases is transmitted to the user.

A database security management system of the present invention is operable to interface between a user and an electronic database and configured to process requests from the user to perform an action with respect to data stored in the database. The system includes a user interface operable to receive a request from the user to obtain data within the electronic database, form a query based on the request, and pass the query to a rule engine. The user request includes a user identifier. The system further includes a data manager operable to submit the request to the database and return requested data to the rule engine. The rule engine includes a plurality of user defined rules which apply security constraints to the query and/or the requested data, based on the user identifier.

In another aspect of the invention, a database security management system is operable to interface between a user and an electronic database and configured to process requests from the user to perform an action with respect to data stored in the database. The system includes a user interface operable to receive a request from the user to obtain data within the database and pass the request to a rule engine. The rule engine includes a plurality of security rules and is operable to evaluate the request against the plurality of rules to determine if the user has authority to perform requested action with respect to the data. The security rules are based on a relation between the user and the data.

In yet another aspect of the present invention, a method for processing requests from a user to perform an action with respect to data stored in an electronic database includes defining a plurality of user defined rules containing security constraints for accessing the data and receiving a request at a user interface. The request is transferred from the user interface to a rule engine. The method further includes applying the plurality of rules to the request to determine if the request passes the security constraints. The rules are based on a relation between the user and the data. The data is accessed to perform the request if the request meets the security constraints.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the present invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
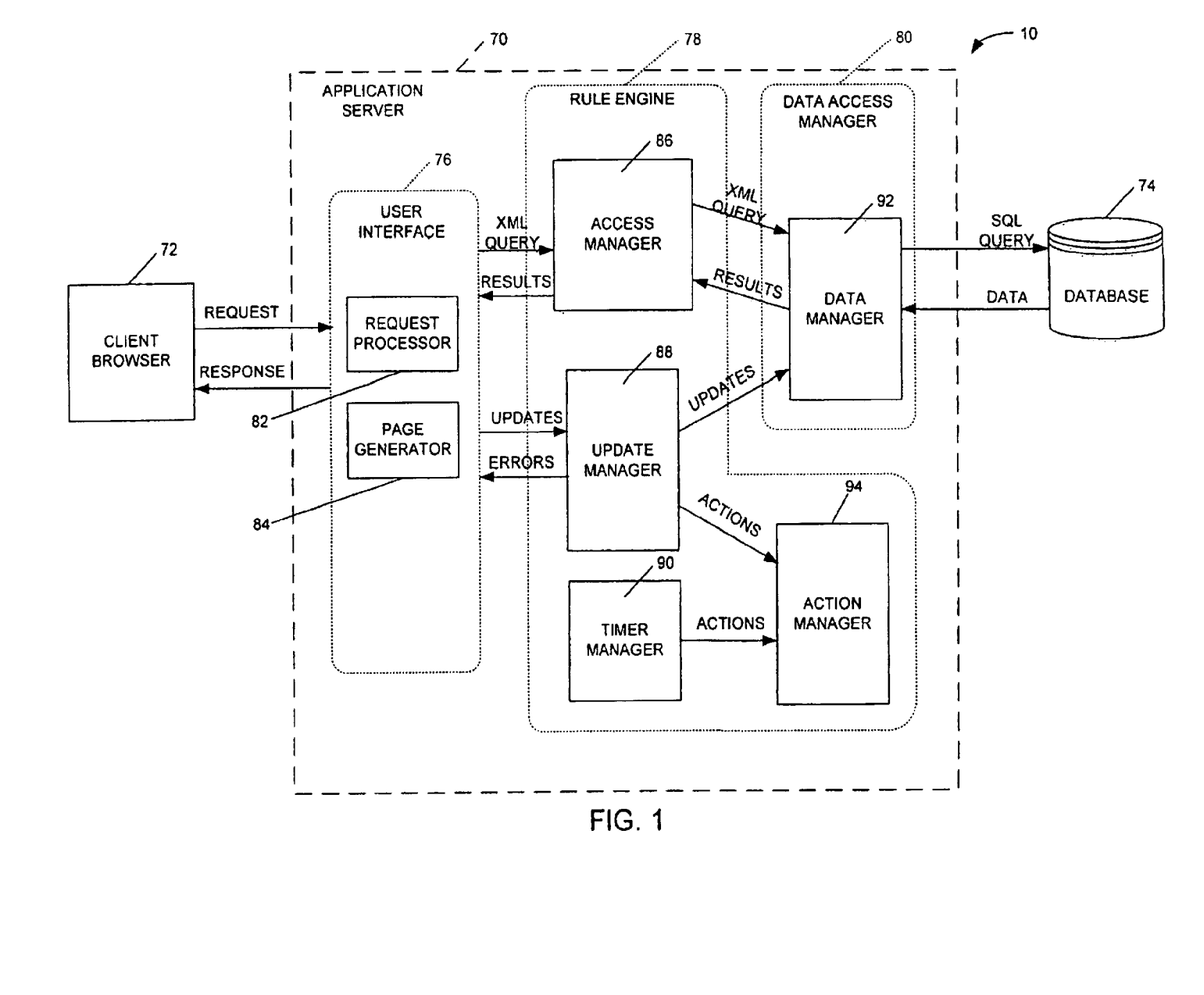
FIG. 1 is a block diagram of a system of the present invention.

FIG. 1 is a block diagram of one embodiment of a system of the present invention. The system allows multiple users to access and update a database while providing user access control to limit the items of data certain users can access in the database, and update control to limit the items of data that can be modified by certain users. The system may also be configured to provide consistency to ensure that all data in the database is valid and triggers which make the system active by responding to changes in the state of the system. The system may allow for response to key events which occur as time passes and data changes in the system. As further described below, the system utilizes a rule based business logic, rather than object oriented code based business objects. Also, an entity-relationship data model is preferably used (see e.g., Chen, Peter (1976): *The Entity-Relationship Model—Toward a Unified View of Data ACM Transactions on Database Systems*).

The system 10 may be used in a network. In one embodiment, the network is the Internet and the information is transmitted in the form of Web pages. The system may be deployed using standard Web browsers for user access, Windows NT application servers and Windows NT or UNIX database servers, for example. Users may also access the application through corporate Intranet sites, for example.

Figure 2:
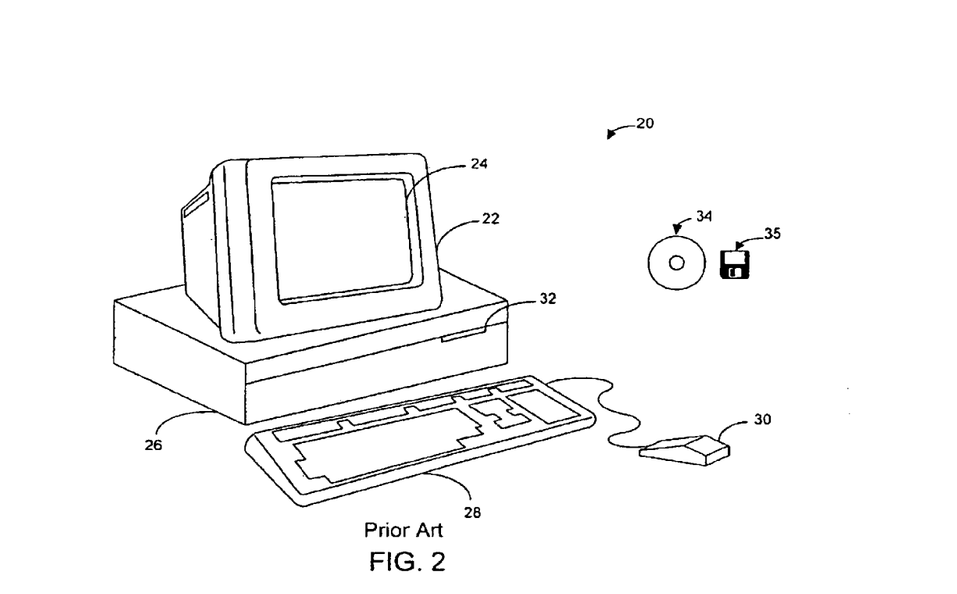
FIG. 2 is a schematic illustrating an example of a computer system that can be used to access a database.

Before proceeding with a discussion of the system 10, a brief discussion of an example of a physical environment in which the system may be used is provided. FIG. 2 illustrates an example of a computer system that may be used within a network to access the database. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 3) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium.

Figure 3:
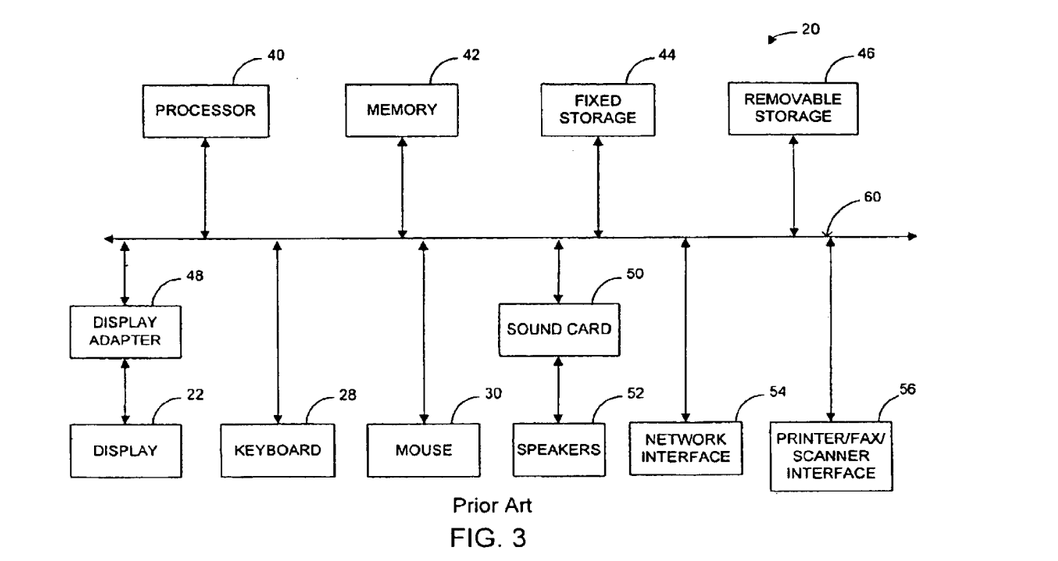
FIG. 3 is a system block diagram of the computer system of FIG. 2.

FIG. 3 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 3. However, these arrows are only illustrative of one possible interconnection scheme serving to link the subsystems. For example, a local bus could be utilized to connect the central processor 40 to the system memory 42 and display adapter 48. Computer system 20 shown in FIGS. 2 and 3 is but an example of a computer system suitable for use with the invention. Other computer architectures having different configurations of subsystems may also be utilized.

Referring again to FIG. 1, the system 10 includes an application server 70 configured to interface with a client (user) browser 72 and a database 74. The application server 70 includes a user interface 76, a rule engine (business logic) 78, and data access manager 80. It is to be understood that the user may be a human accessing the data through a computer, or another computer which has been programmed or instructed to gather information from the database. Whether the user is a human, computer, or interface port it is identifiable by a user ID. The user interface 76, rule engine 78, and database 74 are preferably configured so that each may be changed and maintained independently.

The user interface 76 receives requests from the client and returns information in response to the requests. The user interface 76 may be a graphical user interface displayed on a screen of a computer, or a connection or interface port between two computers such as a client computer and a server, for example. The request may be an HTTP (Hypertext Transfer Protocol) command, for example. The information returned to the client may be in a page containing information formatted in HTML (Hypertext Markup Language), for example. The user interface 76 includes a request processor 82 for receiving the request and formatting it into a query for the rule engine 78, as further described below. The request processor 82 is preferably configured to create a page having identified blanks to be filled in by the user so that the completed page provides all of the information needed by the rule engine 78 to evaluate the access control and business logic for a given transaction. For example, the request may include a user identifier (e.g., user name or ID) and specific information requested from the database or specific data fields to be updated along with the updated information.

The request may include, for example, two components. The first component is a request to perform a set of actions against the database, such as update particular items in the database with values typed in or selected by the user in a form with blanks provided to edit or enter information. The set of actions may consist of any combination of create, update, or delete actions to the database as specified by the form or resulting from a script that is identified by the form, and executed on the server in response to the request. A second component of the form is a request for information to be returned to the user. This is performed after the actions so that the user will see the results of the requested actions (e.g., updated values). The request is processed by loading appropriate templates, which specify the type and format of information to be returned for various kinds of information requests. The templates, together with the original request, specify what information is needed from the database to satisfy the request. The required information is formulated as a query (FIG. 1), which specifies what information is needed. The query is passed to the rule engine 78 so that only the information that is appropriate for the current user, based on applicable security constraints, is returned. The user interface 76 also includes a page generator 84 for generating a page with the results of the query or update, or error notification for display to the user by the browser 72.

The rule engine 78 provides filtering, sorting, and joining of the information requested by the user and controls updates to the database. The rule engine 78 is preferably configurable by a user to update security requirements, consistency rules, and triggers. As shown in FIG. 1, the rule engine 78 includes an access manager 86, update manager 88, timer manager 90, and action manager 94. The access manager 86 supports access to data requested by the user interface 76 and ensures that only appropriate data is provided to the user. The access manager 86 receives queries from the user interface 76, processes the queries as described below, and sends the modified queries or query to the data access manager 80. The data access manager 80 transfers the results obtained from the database 74 to the access manager 86 which may then process the results to further limit the returned information. The access manager 86 sends the modified results to the user interface 76. As further described below, the access manager 86 applies rules to the query and data obtained from the database 74 to control access to the data by the user. The update manager 88 processes, verifies, and elaborates on data updates being performed by the user through the user interface 76. The update manager 88 receives updates from the user interface 76 and sends results of the update request along with any error notifications back to the user interface. The timer manager 90 initiates actions that occur at a scheduled time.

The data access manager 80 includes a data manager 92. The data manager 92 includes the schema (i.e., the organization of the data structures within the database 74) and default values. The data manager 92 is configured to receive an XML query from the access manager 86, submit the query to the database 74, and receive the data issued from the database in response to the query. The query may be changed to SQL (Structured Query Language) format by the data manager 92, or any other suitable database language. The data manager 92 also receives updates from the update manager 88 and submits the updates to the database 74.

Transaction control rules govern what kind of changes a user can make to the database. An example of a transaction control is: "Managers can increase salaries for their employees but only the director of HR can decrease a salary." Transactional control ensures that all data in the database is valid for the current user and that any change to the database preserves the validity of the rule. There are three types of transaction control: static consistency; dynamic consistency; and dynamic security. Static consistency only tests current values in the database. An example is: "A person's salary must be greater then zero." Dynamic consistency tests old and new values. These rules control changes made by any user. An example is "Salaries can never go down." Dynamic security controls what users can do. The rules check whether a particular user is allowed to make a change. An example is "Only the director of human resources can change a salary." Transaction control rules apply across all objects during a change. For example, if a product is sold to a new company, a new product manager must be assigned who works for the new company.

It is to be understood that the configuration of the system 10 or the components of the system may be different than shown and described herein without departing from the scope of the invention. For example, the timer manager 90 and action manager 94 may be removed from the system and the rule engine 78 and data access manager 80 used only for security (e.g., access and update control).

As described above, the system 10 utilizes rule-based business logic, rather than object oriented code based business objects. This allows for modification to the security of the database, either for viewing or updating, without modifying code and re-compiling the system software. Rules may be used to determine the validity of a change or access to the database or trigger an action to occur, for example. Rules may also be used to test for different aspects of the user (e.g., department, role, region). The rules may be grouped into four categories: transaction control; action triggering; object initialization; and access control. Each rule includes a name, an expression, a description, and possibly a help ID which points to information about what may make a rule fail, for example. Multiple rules may be defined for the same object or set of objects. Examples of objects include Partner, Task, Channel Manager, Territory, Product, Vendor, Incentive Program, and Program Template.

Transaction control rules govern what kind of changes a user can make to the database. An example of a transaction control rule is "Every incentive program must have a manager." Transactional control ensures that all data in the database is valid and that any change to the database preserves the validity of the rule. For example, if a new product manager is assigned to a product, he must work for the company that sells the product. Transaction control rules apply across all objects during a change. For example, if a product is sold to a new company, a new product manager must be assigned who works for the new company.

The trigger rules make the system active and are configured to respond to changes in the state of the system. An example of an action triggering rule is "When a task is more than three days late, notify the manager." Triggered actions that update the database are subject to the same consistency and trigger rules as database updates initiated by the user.

An example of an object initialization rule is "When a new partner is signed up, assign it to a territory based on their zip code."

Access control rules govern who can see what information. The user access control rules may depend on any aspect of the user or the data being viewed. For example, to prevent people on the East Coast from seeing sales data for West Coast sales groups, the following rule may be employed:

"Deny access to SalesData if CurrentUser.department.location= East and SalesData.employee.location=West".

Security control on individual fields, as well as objects, preferably uses an explicitly allow/explicitly deny model. If there are no allow rules, it is assumed that no one is allowed to see the object/field. Explicitly deny rules override any allowed access. For example, if one rule explicitly allows a person access, and another rule explicitly denies access, the person will be denied access. It should be noted that other ways of combining multiple rules are also possible.

The security or access control on individual fields or objects may include the security types listed in Table 1, for example.

TABLE 1

| Security Type | Description |
|---|---|
| Object Access Control | Return only objects that that user has access to see. Allows updates only to objects user has update privileges for. |
| Transactional Control | Applies to objects that pass object update security. Allows only updates to fields that also pass the field update rules, if any. |
| Field Access Control | Applies to objects that pass object access security. Only returns fields that the current user has access to see. Allows updates only to fields user has update privileges for. |

The object-level security applies to an entire row of data. For example, Table 2 includes three columns; customer name, sales amount, and date. Object-level security can be used to prevent a user from viewing any data for customers b and c (i.e., shaded rows two and three), for example. Field-level security applies to individual fields of data and can be used, for example, to prevent a user from viewing data in the shaded field of column 3 and row 4 of Table 2.

TABLE 2

SALES DATA

| | CUSTOMER NAME | SALE | DATE |
|---|---|---|---|
| Row 1 | a | $ | date |
| Row 2 | b | $ | date |
| Row 3 | c | $ | date |
| Row 4 | d | $ | date |
| | Column 1 | Column 2 | Column 3 |

The security constraints may be applied to the incoming query and processed in the access manager 86 to form a modified query which is sent to the data manager 92 (as shown in the following example). The security constraints may also be applied by the access manager 86 after the data is returned from the data manager 92 to filter the data before it is sent to the user. In addition, a portion of the security constraints may be applied to the incoming query and the remaining security constraints applied to the obtained data. In a preferred embodiment, the object-level security is applied to the query before it is sent to the database 74 and the field-level security is applied to the data after it is returned from the database.

The following example shows the application of access control rules to the incoming query. Tables 3 and 4 show an employee (person) table and a customer table, respectively. The region and role of each person listed in Table 3, and the region of each customer listed in Table 4 are attributes that can be used to control access to information by a user (e.g., person listed in Table 3).

TABLE 3

Person Table

| Name | Region | Role |
|---|---|---|
| x | East | VP |
| y | West | Sales Representative |

TABLE 4

Customer Table

| Customer | Region |
|---|---|
| a | East |
| b | West |
| c | East |
| d | West |

The rule engine includes the following user defined security rule for Table 2 Sales Data:

"Allow Read Customer X if X.Region=User.Region";

where: 'User' is the person entering the request into the client browser 72.

If user x requests to see all sales data from Table 2, a query will be formed in the request processor 82 and sent to the access manager 86:

"UserxRequests All Sales Data (customer, amount, date)".

The access manager will combine this query with the security rule defined above to form the following modified query for a user in the east region (when the user logs in he is identified as a user in the east region based on his user ID.):

"Get All Sales Data (customer, amount, date) where Customer.region=East".

The user interface and business logic data requirements are thus combined into a single query, which may be further optimized to reduce server load when searching the database 74. The data manager 92 will format this query as an SQL query and submit it to the database 74 which will return the sales data from rows 1 and 3 of Table 2. The returned data may also be filtered by applying additional security rules to the data.

As can be observed from the above example, the combining of the security rules with the user query increases system efficiency since the number of queries sent to the database is reduced. Furthermore, system flexibility is increased since access control can be easily changed by modifying the rules. Since the rule engine 78 is configurable by a user to update security requirements, there is no need to change the database 74. Security policies can be changed by simply modifying the rules within the rule engine 78.

The following is an example illustrating various types of rules governing organization profiles and person profiles (i.e., data records about a given organization or person). The security rules control who can view or edit the appropriate profiles. The security rules in this example allow a person to see the profile of the organization they work for, but only allows certain people to edit the profiles. The profile for an organization includes the data shown in Table 5 and the profile for a person includes the data shown in Table 6.

TABLE 5

| Organization A Profile | |
| --- | --- |
| Employees | Employee Q, Employee R, . . . (all employees of the organization) |
| Team Members | Person X, Person Y, . . . (all people who are part of the team assigned to manage Organization A) |
| Organization Type | Partner (type of organization - either Partner or Vendor) |

TABLE 6

| Person X Profile | |
| --- | --- |
| Organization | Organization C (organization that Person X works for) |
| In Partner Teams | Organization A (the partner organizations that Person X works with) |

The organizations are classified as either a vendor organization or a partner organization. There is only one vendor organization and people who work for the vendor organization are assigned as "team members" to work with different partner organizations. Persons who work for the vendor organization have more privileges than people who work for partner organizations. The rights that a person has are also controlled by the "user rights" that are individually assigned to each person. As will be appreciated by those skilled in the art, multiple data tables may be used and there may be many different relationships which may exist between these multiple data tables.

Figure 4A:
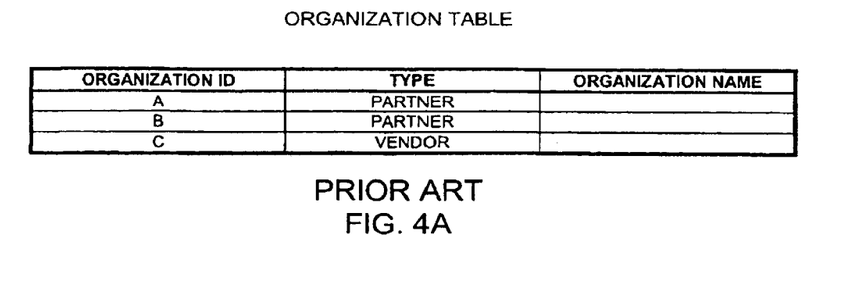
FIGS. 4A–4C are exemplary database tables identifying organization types, employers, and partner teams, respectively.
Figure 4B:
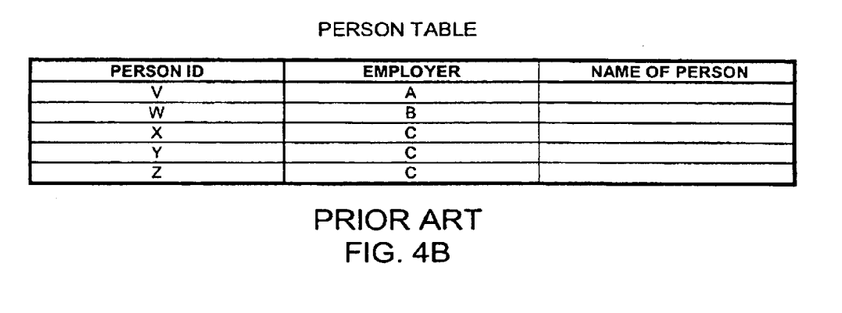
Figure 4C:
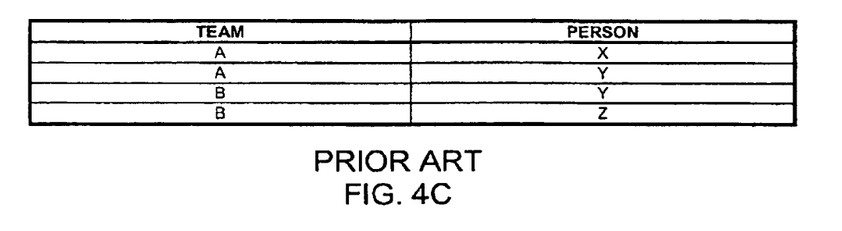
Figure 5:
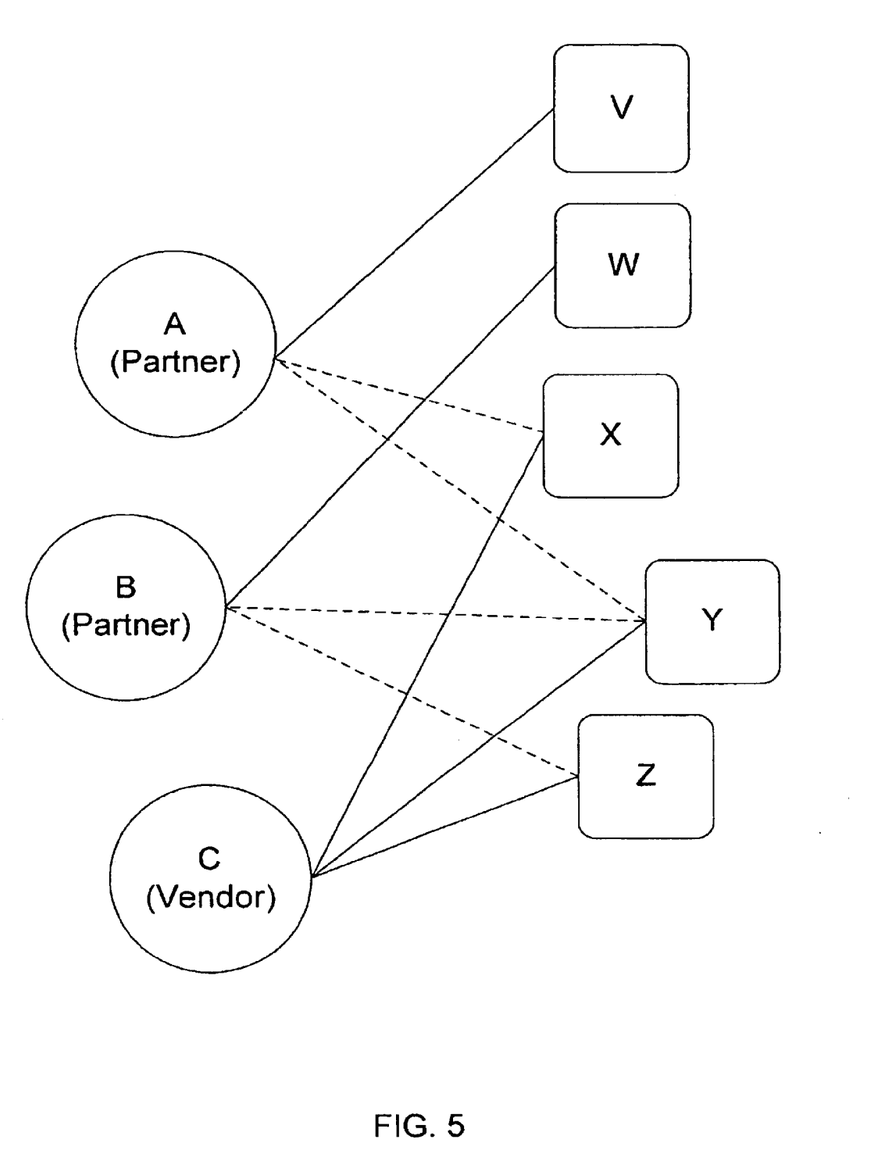
FIG. 5 is a schematic illustrating interrelationships among entities listed in the tables of FIGS. 4A–4C.

FIGS. 4A, 4B, and 4C show data tables for three organizations A, B, C and five employees V, W, X, Y, Z, each person and organization having a profile as described above. The table of FIG. 4A lists the organization type, the table of FIG. 4B lists the employer of each person, and the table of FIG. 4C lists the persons on each partner organization. FIG. 5 shows the interrelationship between the three organizations A, B, C and the five persons V, W, X, Y, Z. Organizations A and B are partner organizations and Organization C is a vendor organization. Employee X works for vendor C (as indicated by the solid line of FIG. 5) and is on the partner team of organization A (as indicated by the dashed line of FIG. 5). Employee Y works for organization C and is on the partner team of organizations A and B. Employee Z works for organization C and is on the partner team for organization B. Employee V works for organization A and employee W works for organization B. Thus, employee X has access to data records relating to organizations A and C; employee Y has access to data records relating to organizations A, B, and C; employee Z has access to data records relating to organizations B and C; employee V has access to data records relating to organization A; and employee W has access to data records relating to organization B. As described below, each employee may have rights to view or edit additional data.

The following are examples of security rules which may be applied when a user requests access to view or edit the person or organization profiles described above. The rules may be grouped based on the user's relationship to the data, user's rights to access or edit data, or a combination of the user's relationship to the data and the user's rights. In addition to these user defined rules, rules may also be based only on the data (e.g., allow access to sales data with sales date before one year ago).

The following are examples of rules that depend only on the user's relationship to the data:

Allow Edit Person Profile X if User=X (user can edit own person profile);

Allow Read Person Profile X If User.Organization=X.Organization (user can view person profiles of own organization);

Allow Read Organization Profile X If User.Organization=X (user can view own organization profile).

The following are examples of rules that depend only on the user's rights:

Allow Edit Person Profile If User.Rights includes "Edit All Person Profiles"

(user can edit all Person profiles);

Allow Edit Organization Profile If User.Rights includes "Edit All Profiles"

(user can edit all organization profiles);

Allow Read Person Profile If User.Rights includes "View All Person Profiles"

(user can view all person profiles);

Allow Read Organization Profile X If User.Rights includes "View All Profiles"

(user can view all organization profiles).

The following are examples of rules that depend upon both the user's relationship to data and the user's rights:

Allow Edit Person Profile X If User.Organization=X.Organization and User.Rights includes "Edit Own Organization Person Profiles"

(user can edit the person profiles within own organization);

Allow Edit Person Profile X If X.Organization.Type="Partner" and User.Rights includes "Edit All Partner Person Profiles"

(user can edit the person profiles within partner organizations);

Allow Edit Organization Profile X If User.Organization=X and User.Rights includes "Edit Own Profile"

(user can edit own organization profile)

Allow Read Person Profile X If User.Rights includes "View All Partner Person Profiles" and X.Organization.Type="Partner"

Figure 6:
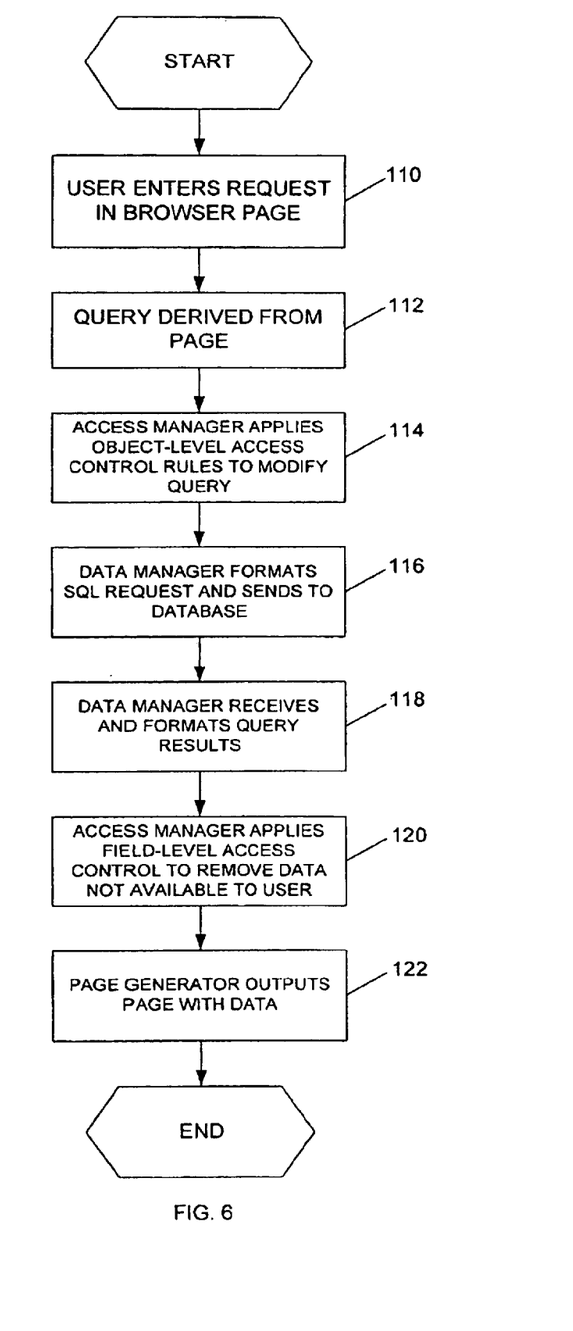
FIG. 6 is a flowchart illustrating a process for requesting information from a database using the system of FIG. 1.

(user can view person profiles of all persons in partner organizations);

FIG. 6 is a flowchart illustrating a process for receiving and processing a request to view data. A request is first entered by a user in a browser page at step 110. The query is derived from the page at step 112. The access control rules are applied by the access manager 86 to produce a modified query, which is preferably optimized to reduce server load (step 114). The SQL code is generated by the data manager 92 and sent to the database 74 to retrieve only the data required by the request and permitted after application of the access control rules (step 116). The query results are returned from the database 74 and shaped to correct format by the data manager 92 (step 118). Field level access control is applied by the access manager 86 to further filter the data returned from the database 74 by removing information that is not available to the user (step 120). The page generator 84 outputs a page formatted using visible data from the database 74 (step 122).

Figure 7:
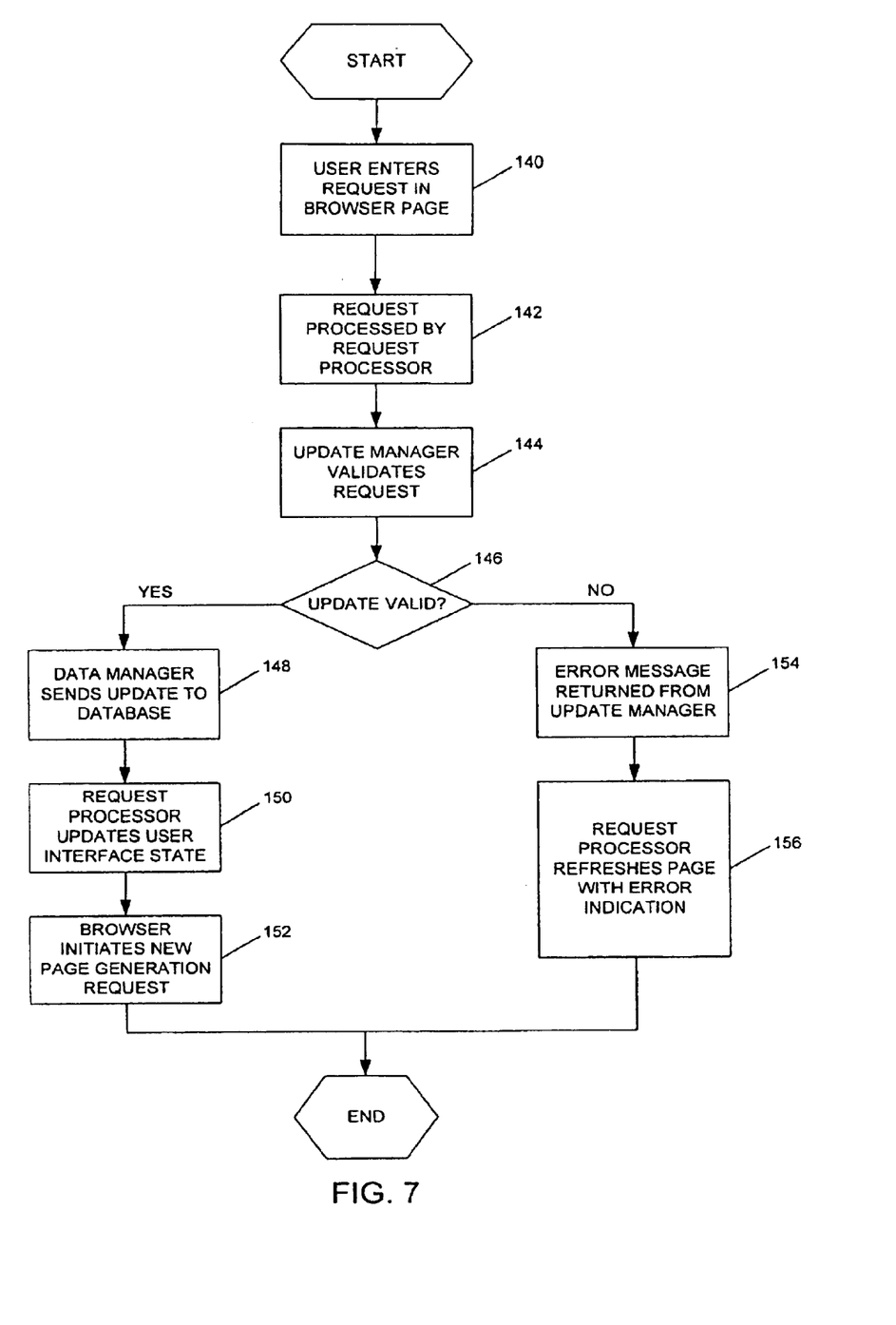
FIG. 7 is a flowchart illustrating a process for updating information within the database using the system of FIG. 1.

The flowchart of FIG. 7 illustrates a process for performing an update to the database 74. The update request is filled in on a browser page by the user (step 140). The request processor 82 processes the request and sends the update to the update manager 88 (step 142). The request is validated against update rules by the update manager 88 and valid updates are sent to the database 74 by the data manager 92 (steps 146 and 148). The user interface state is updated by the request processor 82 and sends back a new page generation request to show the results of the update request to the user (step 150 and 152). If the update is found to be invalid based on the security rules, the request will be returned to the user and he will be notified that the update has not been made (steps 154 and 156).

The rules may also be compiled in advance as database views. A set of views is first created for each combination of user rights (or other attributes) that exist for all current users. Then the rule engine selects the appropriate database views for the current user. The set of views are recompiled when user rights are changed.

It is to be understood that the access and update processes may be different than described above without departing from the scope of the invention. For example, both object-level and field-level security may be applied to the query before it is sent to the database, or both may be applied to the data after it is returned from the database.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for processing requests from a user to perform an action with respect to data stored in an electronic database, the method comprising:

defining a plurality of user defined rules containing security constraints for accessing said data;

receiving at a user interface a request to provide to the user interface data comprising a first set of data elements; transferring the request from the user interface to a rule engine;

applying said plurality of rules to the request to determine if the request passes said security constraints and modifying the request, if required to meet the security constraints, by adding one or more constraints to the request implementing rules for transaction control, action triggering, object initialization and access control; and accessing said data to perform the request if the request meets said security constraints.

2. The method of claim 1 wherein said user defined rules are based on a relation between the user and said data.

3. The method of claim 1 wherein said user defined rules are based on rights associated with said user.

4. The method of claim 1 wherein said user defined rules are based on a relation between said user and requested data and rights associated with said user.

5. The method of claim 1 wherein said action is requesting data from said database and transferring said request comprises transferring a query.

6. The method of claim 5 wherein said plurality of rules comprises object-level rules and field-level rules and wherein modifying said request comprises modifying the query based on said object-level rules.

7. The method of claim 6 further comprising retrieving data from the database and applying said field-level rules to said data.

8. The method of claim 7 further comprising delivering said data to the user in the form of a Web page.

9. The method of claim 5 wherein said plurality of rules comprises field-level rules and wherein modifying said request comprises modifying the query based on said field level rules.

10. The method of claim 1 wherein said action comprises updating said data within the database.

11. The method of claim 10 further comprising notifying the user if requested update is not permitted by said security constraints.

12. The method of claim 1 wherein receiving a request at a user interface comprises receiving a request from a browser.

13. A method for processing requests for accessing a database comprising:

receiving a query for data from the database at a user interface, the query comprising a request to provide to the user interface data comprising a first set of data elements;

transferring said query to a rule engine, the rule engine having a plurality of user defined rules containing security constraints for accessing said data; modifying said query by adding one or more constraints to the query; issuing said modified query to the database implementing rules for transaction control, action triggering, object initialization and access control; and transmitting data obtained from the database to the user.

14. The method of claim 13 further comprising applying said plurality of rules to the data obtained from the database to filter the data based on the security constraints.

15. A security system operable to interface between a user and an electronic database and configured to process requests from the user to perform an action with respect to data stored in the database, the system comprising:

a user interface operable to receive a request from the user to obtain data within the electronic database, the request comprising a request to provide to the user interface data comprising a first set of data elements, form a query based on the request, and pass the query to a rule engine, the user request including a user identifier; and a data manager operable to submit said query to the database and return requested data to the rule engine;

the rule engine comprising a plurality of user defined rules which apply security constraints to at least one of said query and requested data based on the user identifier, including by modifying said query, if required to meet the security constraints, by adding one or more constraints to the query and implementing rules for transaction control, action triggering, object initialization and access control.

16. The system of claim 15 wherein the security constraints are applied to the query within the rule engine to modify the query based on the security constraints before the query is submitted to the database.

17. The system of claim 15 wherein the security constraints are applied to the returned data to filter the data based on the security constraints before being transmitted tithe user.

18. The system of claim 15 wherein the security constraints are applied to the query to modify the query before being submitted to the database and to the returned data to filter the data based on the security constraints.

19. The system of claim 15 further comprising a client browser configured for receiving requests from the user and sending the requests to the user interface.

20. The system of claim 15 wherein the database utilizes an entity-relationship model.

21. A security system operable to interface between a user and an electronic database and configured to process requests from the user to perform an action with respect to data stored in the database, the system comprising:

a user interface operable to receive a request from the user to obtain data within the database and pass the request to a rule engine, the request comprising a request to provide to the user interface data comprising a first set of data elements; and a rule engine comprising a plurality of security rules and operable to evaluate the request against said plurality of rules to determine if the user has authority to perform the requested action with respect to the data, the security rules being based on a relation between the user and said data, the rule engine being configured to modify said request, if required to satisfy the security rules, by adding one or more constraints to the request and implementing rules for transaction control, action triggering object initialization and access control.

22. A method for processing requests from a user to perform an action with respect to data stored in an electronic database, the method comprising:

defining a plurality of user defined rules containing security constraints for accessing said data, said user defined rules being based on a relation between the user and said data;

receiving at a user interface a request to provide to the user interface data comprising a first set of data elements;

transferring the request from the user interface to a rule engine;

applying said plurality of rules to the request to determine if the request passes said security constraints;

modifying said request, if it is determined that said request does not pass the security constraints, by adding one or more constraints to the request implementing rules for transaction control, action triggering, object initialization and access control; and accessing said data to perform the request if the request meets said security constraints.

* * * * *